UNITED STATES PATENT OFFICE.

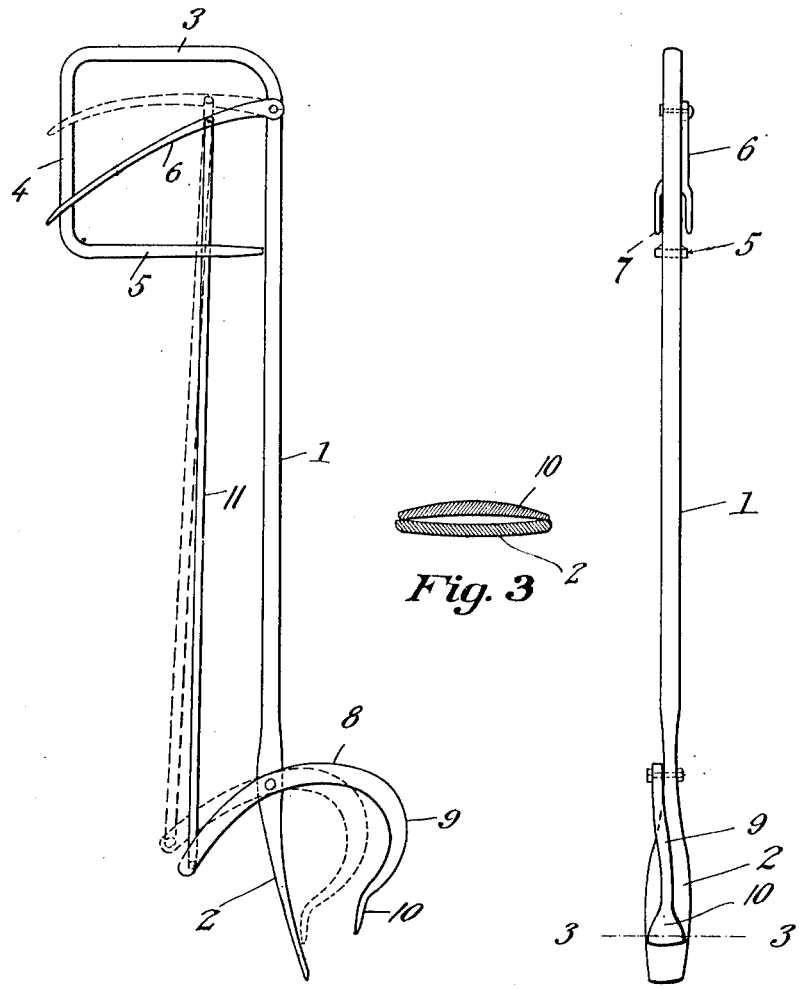

JOHN F. GUY AND JOHN H. BLOM, OF EVERETT, WASHINGTON.

WEED-PULLING DEVICE.

1,061,175.  Specification of Letters Patent.  Patented May 6, 1913.

Application filed December 14, 1912. Serial No. 736,771.

*To all whom it may concern:*

Be it known that we, JOHN F. GUY and JOHN H. BLOM, citizens of the United States, residing at Everett, in the county of Snohomish and State of Washington, have invented new and useful Improvements in Weed-Pulling Devices, of which the following is a specification.

This invention relates to weed pulling devices, and it has for its object to produce a simple and efficient implement for this purpose which may be conveniently manipulated by the operator while in a standing position and with one hand.

A further object of the invention is to produce a simple and efficient weed puller having coöperating weed engaging jaws, one of which has an extension that may serve as a fulcrum to give proper purchase to the device in the act of extracting the root of the weed from the ground.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing, Figure 1 is a side elevation of an implement constructed in accordance with the invention. Fig. 2 is an edge view of the same. Fig. 3 is a sectional detail view, enlarged, taken on the line 3—3 in Fig. 2.

Corresponding parts in the several figures are denoted by like characters of reference.

A staff consisting of a metallic rod 1 is shaped to form at the lower end thereof a jaw 2 which is slightly curved transversely, as will be best seen by reference to Fig. 3. The upper end of the staff or rod 1 is bent to form a handle 3, the outer end of which has a depending arm 4 from the lower end of which a brace 5 extends in the direction of the staff 1.

Pivoted on the staff 1 near the upper end thereof and closely adjacent to the handle 3 is a hand lever 6, the free end of which is bifurcated, as shown at 7, said bifurcated end being engaged with and guided on the depending arm 4. Pivoted on the staff 1 near the lower end thereof and above the jaw 2 is a lever 8, one end of which is bent to form an arcuate offset 9 having a terminal jaw 10, facing the jaw 2 and curved transversely, as seen in Fig. 3, by reference to which it will be observed that the concaved faces of the jaws 2 and 10 are opposed to each other. The conformation of said jaws will thus enable them to firmly grasp the lower part of the stem or the root of a plant or weed between them. The other end of the lever 8 is connected by a rod 11 with the hand lever 6, and it will be observed that the parts are so constructed and assembled that the hand lever 6, the rod 11 and the arm of the lever 8 with which said rod is connected will overbalance the opposite arm of said lever 8 having the arcuate offset 9 and the jaw 10. Hence, when the implement is held by the handle 3, and the hand lever 6 is unobstructed, said hand lever, together with the rod 11, will gravitate downwardly, and the jaw carrying arm of the lever 8 will be automatically lifted or elevated, carrying the jaw 10 outwardly from the jaw 3.

In the operation of this device, the operator holding the implement by the handle 3 and standing upright inserts the jaw 2 into the ground adjacent to the root of the weed that is to be extracted. While bearing down on the handle 3, the lever 6 is now manipulated to actuate the lever 8, thereby forcing the jaw 10 into the ground adjacent to the opposite side of the weed, the root of which will thus be grasped and held securely between the jaws 2 and 10. By a slight rotary movement of the staff 1, which is easily accomplished, owing to the fact that the handle 3 extends at an angle to said staff, the root will be loosened and may be easily extracted. If necessary, leverage may be exerted by tilting the tool so as to cause the arcuate projecting portion 9 of the lever 8 to bear upon the ground, furnishing the necessary purchase to forcibly extract the root. This action will also serve to cause the jaws 2 and 10 to close together upon the root, thereby preventing slipping.

Having thus described the invention, what is claimed as new, is:—

1. In a weed pulling implement, a staff having a handle extending at an angle thereto, and an arm depending from said handle and spaced thereby from the staff, a hand lever pivoted on the staff and having a bifurcated end guided on the arm, a jaw at the lower end of the staff, a jaw carrying lever pivoted on the staff, and a rod connecting the jaw carrying lever with the hand lever.

2. In a weed pulling implement, a staff having a handle extending at an angle thereto, and an arm depending from the handle and spaced thereby from the staff, a hand lever pivoted on the staff and having a bifurcated end engaging and guided on the arm, a jaw at the lower end of the staff, a lever pivoted on the staff adjacent to the jaw and having an arcuate offset portion provided with a terminal jaw, and a rod connecting the jaw carrying lever with the hand lever.

In testimony whereof we affix our signatures in presence of two witnesses.

JOHN F. GUY.
JOHN H. BLOM.

Witnesses:
F. A. TAYLOR,
J. E. BOWEN.